United States Patent
Zar et al.

(10) Patent No.: US 11,043,017 B2
(45) Date of Patent: Jun. 22, 2021

(54) HIGH DEFINITION COLORING OF HEART CHAMBERS

(71) Applicant: Biosense Webster (Israel) Ltd., Yokneam (IL)

(72) Inventors: Lior Zar, Poria Illit (IL); Natan Sharon Katz, Atlit (IL); Benjamin Cohen, Haifa (IL)

(73) Assignee: Biosense Webster (Israel) Ltd., Yokneam (IL)

( * ) Notice: Subject to any disclaimer, the term of this patent is extended or adjusted under 35 U.S.C. 154(b) by 0 days.

(21) Appl. No.: 16/351,238

(22) Filed: Mar. 12, 2019

(65) Prior Publication Data

US 2019/0213777 A1 Jul. 11, 2019

Related U.S. Application Data

(62) Division of application No. 15/009,285, filed on Jan. 28, 2016, now Pat. No. 10,282,888.

(51) Int. Cl.
| | |
|---|---|
| *G06T 15/00* | (2011.01) |
| *G06T 17/00* | (2006.01) |
| *G06T 7/00* | (2017.01) |
| *G06T 19/20* | (2011.01) |

(52) U.S. Cl.
CPC .......... *G06T 15/005* (2013.01); *G06T 7/0012* (2013.01); *G06T 17/00* (2013.01); *G06T 19/20* (2013.01); *G06T 2200/04* (2013.01); *G06T 2207/30048* (2013.01); *G06T 2210/41* (2013.01); *G06T 2219/2012* (2013.01)

(58) Field of Classification Search
None
See application file for complete search history.

(56) References Cited

U.S. PATENT DOCUMENTS

| | | |
|---|---|---|
| 5,546,951 A | 8/1996 | Ben-Haim |
| 5,738,096 A | 4/1998 | Ben-Haim |
| 6,226,542 B1 | 5/2001 | Reisfeld |
| 6,232,980 B1 * | 5/2001 | Liepa ...................... G06T 15/04 345/419 |
| 6,301,496 B1 | 10/2001 | Reisfeld |
| 6,501,471 B1 * | 12/2002 | Venkataraman ........ G06T 15/08 345/424 |

(Continued)

FOREIGN PATENT DOCUMENTS

| | | |
|---|---|---|
| EP | 2902973 | 8/2015 |
| EP | 3156975 | 4/2017 |

(Continued)

OTHER PUBLICATIONS

Wald et al. ("Laplacian Interpolation on Triangulated Tissue Surface Models;" 2014 IEEE Conference on Biomedical Engineering and Sciences, Dec. 8-10, 2014, Miri, Sarawak, Malaysia (Year: 2014).*

(Continued)

*Primary Examiner* — Edward Martello

(57) ABSTRACT

A 3-dimensional image is displayed in high resolution colors by generating a 3-dimensional model as a triangular mesh, converting the mesh into a grid of voxels, and assigning attribute values to a portion of the voxels. Laplacian interpolation based on the portion of the voxels is applied for iteratively calculating interpolated attribute values of other voxels. The voxels are rendered as a colored image according to the attribute values on a display.

8 Claims, 7 Drawing Sheets

(56) References Cited

U.S. PATENT DOCUMENTS

| | | | |
|---|---|---|---|
| 6,814,733 B2 | 1/2004 | Schwartz | |
| 6,690,963 B2 | 2/2004 | Ben-Haim | |
| 6,867,774 B1 * | 3/2005 | Halmshaw | G06T 15/08 345/424 |
| 6,892,091 B1 | 5/2005 | Ben-Haim | |
| 6,997,924 B2 | 2/2006 | Schwartz | |
| 7,156,816 B2 | 1/2007 | Schwartz | |
| 7,536,218 B2 | 5/2009 | Govari | |
| 7,756,576 B2 | 7/2010 | Levin | |
| 8,274,513 B1 | 9/2012 | Ubieto | |
| 8,428,690 B2 | 4/2013 | Li | |
| 2005/0018885 A1 | 1/2005 | Chen | |
| 2005/0185836 A1 | 8/2005 | Huang | |
| 2009/0190811 A1 | 7/2009 | Zheng | |
| 2011/0206247 A1 | 8/2011 | Dachille | |
| 2015/0164356 A1 | 6/2015 | Merchon et al. | |

FOREIGN PATENT DOCUMENTS

| | | |
|---|---|---|
| WO | 96/05768 | 2/1996 |
| WO | 14/118535 | 8/2014 |

OTHER PUBLICATIONS

European Search Report dated Jun. 1, 2017 from corresponding European Patent Application No. 17153440.7.

Office Action for U.S. Appl. No. 15/009,285, dated Mar. 9, 2018.

Office Action for U.S. Appl. No. 15/009,285, dated Aug. 15, 2018.

Hen, Min et al., Constructive Volume Geometry Applied to Visualization of Cardiac Anatomy and Electrophysiology, International Journal of Bifurcation and Chaos, Dec. 1, 2003, pp. 3591-3604, vol. 13, No. 12.

Kaufman, Arie E., "Voxels as a Computational Representation of Geometry", ACMSiggraph Course Notes, Jan. 1, 1994, pp. 1-45.

Vetter, Frederick J. et al., "Three-Dimensional Analysis of Regional Cardiac Function: A Model of Rabbit Ventricular Anatomy", Progress in Biophysics and Molecular Biology, Mar. 1, 1998, pp. 157-183, vol. 69, No. 2-3.

Wilson, Kevin et al., "Dynamic Cardiac Mapping on Patient-Specific Cardiac Models", Medical Image Computing and Computer-Assisted Intervention—MICCAI, Sep. 6, 2008, pp. 967-974.

Press, William H., "CS395T Computational Statistics With Application to Bioinformatics", The University of Texas at Austin, Spring 2010, pp. 1-13.

Wald, Andrew J., et al., "Laplacian Interpolation on Triangulated Tissue Surface Models", 2014 IEEE Conference on Biomedical Engineering and Sciences, Dec. 8-10, 2014, Miri, Sarawak, Malaysia.

""Trilinear Interpolation"", Wikipedia, https://en.wikipedia.org/wiki/Trilinear_interpolation, pp. 1-3.

\* cited by examiner

HIGH DEFINITION COLORING OF HEART CHAMBERS

CLAIM OF PRIORITY AND RELATED APPLICATION DATA

This application is a divisional of U.S. application Ser. No. 15/009,285 filed on Jan. 28, 2016, which is incorporated herein by reference in its entirety and for all purposes.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to detecting, measuring or recording bioelectric signals of the body. More particularly, this invention relates to analysis of electrical signals of the heart for diagnostic purposes.

2. Description of the Related Art

Cardiac arrhythmias such as atrial fibrillation are an important cause of morbidity and death. Commonly assigned U.S. Pat. Nos. 5,546,951, and 6,690,963, both issued to Ben Haim, and PCT application WO 96/05768, all of which are incorporated herein by reference, disclose methods for sensing an electrical property of heart tissue, for example, local activation time, as a function of the precise location within the heart. Data are acquired with one or more catheters having electrical and location sensors in their distal tips, which are advanced into the heart. Methods of creating a map of the electrical activity of the heart based on these data are disclosed in commonly assigned U.S. Pat. Nos. 6,226,542, and 6,301,496, both issued to Reisfeld, which are incorporated herein by reference.

As indicated in these patents, location and electrical activity are typically initially measured on about 10 to about 20 points on the interior surface of the heart. These data points are then generally sufficient to generate a preliminary reconstruction or map of the cardiac surface. The preliminary map is often combined with data taken at additional points in order to generate a more comprehensive map of the heart's electrical activity. Indeed, in clinical settings, it is not uncommon to accumulate data at 100 or more sites to generate a detailed, comprehensive map of heart chamber electrical activity. The generated detailed map may then serve as the basis for deciding on a therapeutic course of action, for example, tissue ablation, to alter the propagation of the heart's electrical activity and to restore normal heart rhythm.

Catheters containing position sensors may be used to determine the trajectory of points on the cardiac surface. These trajectories may be used to infer motion characteristics such as the contractility of the tissue. As disclosed in U.S. Pat. No. 5,738,096, issued to Ben Haim, which is incorporated herein by reference, maps depicting such motion characteristics may be constructed when the trajectory information is sampled at a sufficient number of points in the heart.

Electrical activity at a point in the heart is typically measured by advancing a catheter containing an electrical sensor at or near its distal tip to that point in the heart, contacting the tissue with the sensor and acquiring data at that point. One drawback with mapping a cardiac chamber using a catheter containing only a single, distal tip electrode is the long period of time required to accumulate data on a point-by-point basis over the requisite number of points required for a detailed map of the chamber as a whole. Accordingly, multiple-electrode catheters have been developed to simultaneously measure electrical activity, such as local activation times (LAT) at multiple sampled points in the heart chamber.

Laplacian interpolation has been proposed for producing maps and images to display the electrical activity, but is fraught with difficulties, as required conditions may not be met in practice. One algorithm for performing the Laplacian interpolation is given in the document *Laplacian Interpolation on Triangulated Tissue Surface Models*, Andrew J. Wald, et al., 2014 IEEE Conference on Biomedical Engineering and Sciences, 8-10 Dec. 2014, Miri, Sarawak, Malaysia.

SUMMARY OF THE INVENTION

In the past 3-dimensional mapping systems, such as the CARTO® 3 System, available from Biosense Webster, Inc., 3333 Diamond Canyon Road, Diamond Bar, Calif. 91765, have interpolated sample points by using a weighted mean that is configured to be inversely proportional to the geodesic distance between points on the surface and have displayed the results in pseudo-colored maps. One problem with this type of interpolation is that the geodesic distances are usually calculated using edges of a triangle, making the coloring highly dependent on the triangulation of the mesh.

Commonly assigned U.S. application Ser. No. 14/881,192, entitled Voxelization of a Mesh, which is herein incorporated by reference, improves on the interpolation by first transforming the mesh of triangles into a grid of congruent cubic voxels. Briefly, sample points are interpolated by defining a mesh of a surface, each 3-dimensional triangle in the group having 3-dimensional vertices with respective 3-dimensional coordinates, and transforming each 3-dimensional triangle into a 2-dimensional triangle having 2-dimensional vertices corresponding respectively to the 3-dimensional vertices, each 2-dimensional vertex having respective 2-dimensional pixel coordinates and a triplet of pixel attributes corresponding to the 3-dimensional coordinates of a corresponding 3-dimensional vertex. Each 2-dimensional triangle is passed to a graphics processor, which treats the triplet of pixel attributes of each 2-dimensional vertex as interpolatable values. The graphics processor computes respective triplets of interpolated pixel attributes for pixels within each 2-dimensional triangle by interpolation between the pixel attributes of the 2-dimensional vertices, and a 3-dimensional image of the surface is rendered by converting the interpolated pixel attributes computed by the graphics processor into voxel coordinates in the 3-dimensional image.

Embodiments of the present invention further improve on the interpolation by first transforming the mesh of triangles into a grid of congruent cubic voxels and using 3-dimensional Laplacian interpolation to interpolate the colors representing the interpolated pixel attributes. This volume-based method employs a graphics processor to perform its calculations in a highly parallel manner, and display the results in near real-time. It has been observed that Laplace's equation, $\nabla^2 y=0$, may be regarded as the perfect interpolator because it minimizes the integrated square of the gradient, $$\int_\Omega |\nabla y|^2 d\Omega$$

There is provided according to embodiments of the invention a method, which is carried out by generating a 3-dimensional model as a triangular mesh, converting the mesh into a grid of voxels, and assigning attribute values to a portion of the voxels. The method is further carried out by using Laplacian interpolation based on the portion of the voxels, to iteratively calculate interpolated attribute values of the other voxels, and then rendering the voxels as a colored image on a display.

According to an aspect of the method, the Laplacian interpolation applied to a voxel is carried out as a plurality Laplacian interpolations with neighboring voxels thereof.

According to one aspect of the method an average function is applied to the plurality of Laplacian interpolations.

The method is further carried out by assigning colors according to the attribute values and the interpolated attribute value of the voxels. The voxels are rendered as a plurality of screen pixels, and trilinear interpolation is performed for each screen pixel with corresponding screen pixels in bounding voxels.

There is further provided according to embodiments of the invention a method, which is carried out by generating a 3-dimensional model of a portion of a heart as a grid of voxels, and receiving via an intracardiac probe electrophysiologic attribute values at known locations in the heart. The method is further carried out by assigning the attribute values of the known locations to corresponding voxels of the grid to establish a set of voxels having known attributes, iteratively determining the attribute values of other voxels in the grid by Laplacian interpolation of the attribute values of members of the set to assign interpolated attribute values to the other voxels, and rendering a 3-dimensional image of the voxels.

According to an aspect of the method, rendering is performed by assigning colors according to the attribute values and the interpolated attribute values of the voxels and performing pixel-by-pixel trilinear interpolation on the voxels.

Yet another aspect of the method includes selecting ones of the voxels in the grid that touch or contain a surface of the model for interpolation.

There is further provided according to embodiments of the invention an apparatus including a processor configured for generating a 3-dimensional model of a portion of a heart as a grid of voxels, and from an intracardiac probe receiving electrophysiologic attribute values at known locations in the heart. The apparatus includes a graphics processing unit configured for assigning the attribute values of the known locations to corresponding voxels of the grid to establish a set of voxels with known attribute values, iteratively determining the attribute values of other voxels in the grid by Laplacian interpolation of the attribute values of members of the set, and rendering a 3-dimensional image of the voxels.

There is further provided according to embodiments of the invention a method 3-dimensional rendering, which is carried out by receiving a group of 3-dimensional triangles defining a triangular mesh of a 3-dimensional surface. Each 3-dimensional triangle in the group has three 3-dimensional vertices with respective 3-dimensional coordinates. The method is further carried out by transforming each 3-dimensional triangle into a corresponding 2-dimensional triangle having three 2-dimensional vertices corresponding respectively to the 3-dimensional vertices. Each 2-dimensional vertex has respective 2-dimensional pixel coordinates and a triplet of pixel attributes corresponding to the 3-dimensional coordinates of a corresponding 3-dimensional vertex. The method is further carried out by passing each 2-dimensional triangle to a graphics processor, which treats the triplet of pixel attributes of each 2-dimensional vertex as interpolatable values, in the graphics processor computing respective triplets of interpolated pixel attributes for pixels within each 2-dimensional triangle, converting the interpolated pixel attributes computed by the graphics processor into voxels, assigning attribute values to a portion of the voxels to establish a set of known voxels, iteratively performing Laplacian interpolation between the known voxels and other voxels to assign interpolated attribute values to the other voxels, and rendering a 3-dimensional image of the voxels.

According to another aspect of the method, converting the interpolated pixel attributes includes computing for each 3-dimensional triangle an average value of the triplets of interpolated pixel attributes of respective transformed 2-dimensional triangles thereof.

An additional aspect of the method includes, after passing a given 2-dimensional triangle to the graphics processor, filling the given 2-dimensional triangle with the pixels within the given 2-dimensional triangle.

According to another aspect of the method, the interpolated pixel attributes comprise a weighted interpolation of the triplet of pixel attributes of each of the 2-dimensional vertices.

According to one aspect of the method, the weighted interpolation includes applying a weight to the triplet of pixel attributes of a given 2-dimensional vertex that is inversely proportional to a distance of a given pixel to the given 2-dimensional vertex.

According to a further aspect of the method, converting the interpolated pixel attributes into voxel coordinates includes enclosing the triangular mesh in a rectangular parallelepiped of voxels, and selecting ones of the voxels containing or touching the interpolated pixel attributes as voxels of the surface.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the various principles of the present invention. It will be apparent to one skilled in the art, however, that not all these details are necessarily needed for practicing the present invention. In this instance, well-known circuits, control logic, and the details of computer program instructions for conventional algorithms and processes have not been shown in detail in order not to obscure the general concepts unnecessarily.

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Definitions

The adjectives "2-dimensional" and "3-dimensional" as applied to certain objects herein, e.g., triangles, vertices, pixels, are notations referencing the objects in 2-dimensional and 3-dimensional space, respectively. For example, a 2-dimensional vertex may refer to coordinates of a projection of a vertex of a triangle in 3-dimensional space onto a 2-dimensional surface.

Overview

Figure 1:
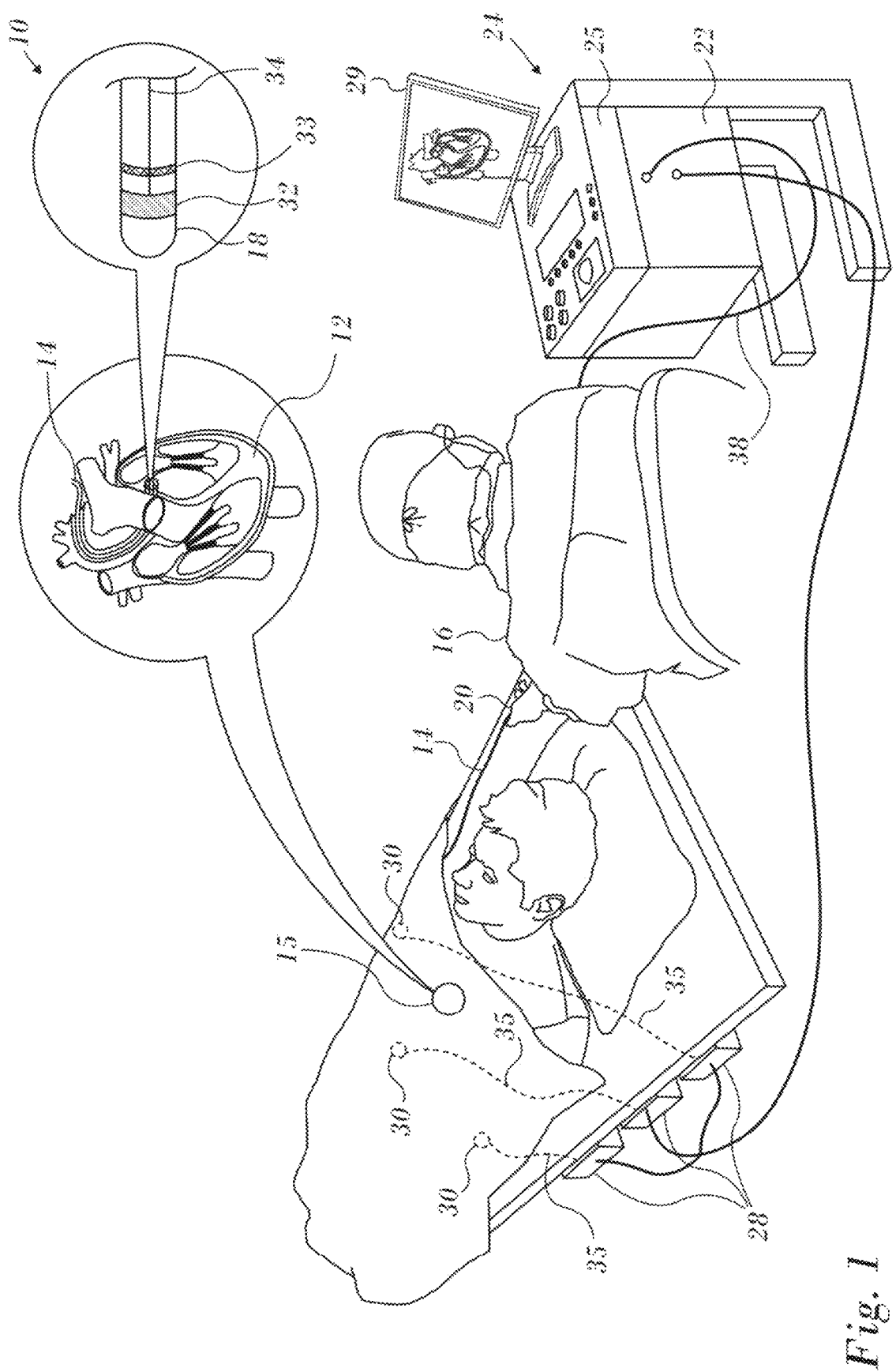
FIG. 1 is a pictorial illustration of a system for evaluating electrical activity in a heart of a living subject in accordance with an embodiment of the invention.

Turning now to the drawings, reference is initially made to FIG. 1, which is a pictorial illustration of a system 10 for performing diagnostic and therapeutic procedures on a heart 12 of a living subject, which is constructed and operative in accordance with a disclosed embodiment of the invention. The system 10 is configured to determine voxels in a 3-dimensional surface 15. The system comprises a catheter 14, which is percutaneously inserted by an operator 16 through the patient's vascular system into a chamber or vascular structure of the heart 12. The operator 16, who is typically a physician, brings the catheter's distal tip 18 into contact with the heart wall, for example, at an ablation target site. Electrical activation maps may be prepared, according to the methods disclosed in U.S. Pat. Nos. 6,226,542, and 6,301,496, and in commonly assigned U.S. Pat. No. 6,892,091, whose disclosures are herein incorporated by reference. One commercial product embodying elements of the system 10 is the above-noted CARTO® 3 System. This system may be modified by those skilled in the art to embody the principles of the invention described herein.

Areas determined to be abnormal, for example by evaluation of the electrical activation maps, can be ablated by application of thermal energy, e.g., by passage of radiofrequency electrical current through wires in the catheter to one or more electrodes at the distal tip 18, which apply the radiofrequency energy to the myocardium. The energy is absorbed in the tissue, heating it to a point (typically about 50 OC) at which it permanently loses its electrical excitability. When successful, this procedure creates non-conducting lesions in the cardiac tissue, which disrupt the abnormal electrical pathway causing the arrhythmia. The principles of the invention can be applied to different heart chambers to diagnose and treat many different cardiac arrhythmias.

The catheter 14 typically comprises a handle 20, having suitable controls on the handle to enable the operator 16 to steer, position and orient the distal end of the catheter as desired for the ablation. To aid the operator 16, the distal portion of the catheter 14 contains position sensors (not shown) that provide signals to a processor 22, located in a console 24. The processor 22 may fulfill several processing functions as described below.

Ablation energy and electrical signals can be conveyed to and from the heart 12 through one or more ablation electrodes 32 located at or near the distal tip 18 via cable 34 to the console 24. Pacing signals and other control signals may be conveyed from the console 24 through the cable 34 and the electrodes 32 to the heart 12. Sensing electrodes 33, also connected to the console 24 are disposed between the ablation electrodes 32 and have connections to the cable 34.

Wire connections 35 link the console 24 with body surface electrodes 30 and other components of a positioning sub-system for measuring location and orientation coordinates of the catheter 14. The processor 22, or another processor (not shown) may be an element of the positioning subsystem. The electrodes 32 and the body surface electrodes 30 may be used to measure tissue impedance at the ablation site as taught in U.S. Pat. No. 7,536,218, issued to Govari et al., which is herein incorporated by reference. A temperature sensor (not shown), typically a thermocouple or thermistor, may be mounted on or near each of the electrodes 32.

The console 24 typically contains one or more ablation power generators 25. The catheter 14 may be adapted to conduct ablative energy to the heart using any known ablation technique, e.g., radiofrequency energy, ultrasound energy, and laser-produced light energy. Such methods are disclosed in commonly assigned U.S. Pat. Nos. 6,814,733, 6,997,924, and 7,156,816, which are herein incorporated by reference.

In one embodiment, the positioning subsystem comprises a magnetic position tracking arrangement that determines the position and orientation of the catheter 14 by generating magnetic fields in a predefined working volume and sensing these fields at the catheter, using field generating coils 28. The positioning subsystem U.S. Pat. No. 7,756,576, which is hereby incorporated by reference, and in the above-noted U.S. Pat. No. 7,536,218.

As noted above, the catheter 14 is coupled to the console 24, which enables the operator 16 to observe and regulate the functions of the catheter 14. Console 24 includes the processor 22, preferably a computer with appropriate signal processing circuits. The processor is coupled to drive a monitor 29. The signal processing circuits typically receive, amplify, filter and digitize signals from the catheter 14, including signals generated by the above-noted sensors and a plurality of location sensing electrodes or magnetic sensors (not shown) located distally in the catheter 14. The digitized signals are received and used by the console 24 and the positioning system to compute the position and orientation of the catheter 14 and to analyze the electrical signals from the electrodes. The processor 22 comprises modules and subsystems that perform other functions described in detail hereinbelow.

Typically, the system 10 includes other elements, which are not shown in the figures for the sake of simplicity. For example, the system 10 may include an electrocardiogram (ECG) monitor, coupled to receive signals from one or more body surface electrodes, so as to provide an ECG synchronization signal to the console 24. As mentioned above, the system 10 typically also includes a reference position sensor, either on an externally-applied reference patch attached to the exterior of the subject's body, or on an internally-placed catheter, which is inserted into the heart 12 maintained in a fixed position relative to the heart 12. Conventional pumps and lines for circulating liquids through the catheter 14 for cooling the ablation site are provided. The system 10 may receive image data from an external imaging modality, such as an MRI unit or the like and includes image processors that can be incorporated in or invoked by the processor 22 for generating and displaying images that are described below.

Figure 2:
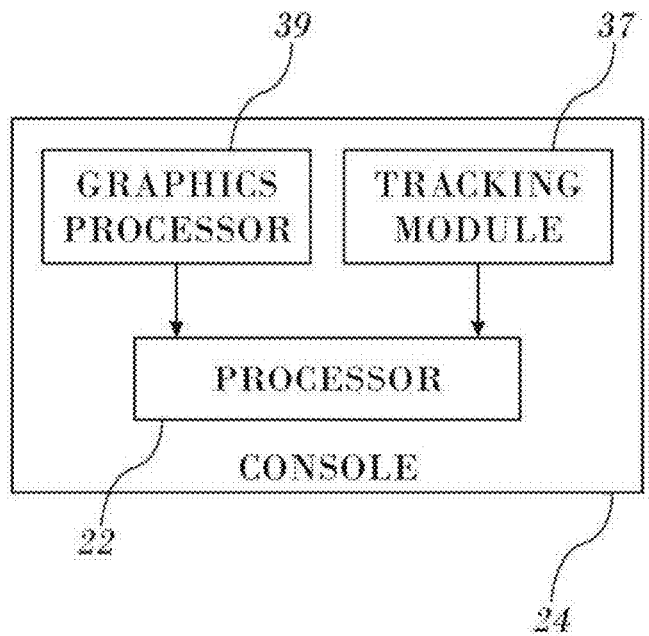
FIG. 2 is a block diagram of aspects of a processor in the system shown in FIG. 1 in accordance with an embodiment of the invention.

Reference is now made to FIG. 2, which is a block diagram of aspects of the processor 22 in accordance with an embodiment of the invention. Typically the processor 22 is located in the console 24 (FIG. 1), but it can be remote or distributed among several sites. The processor 22 may use a tracking module, such as tracking module 37, to convert signals from the above-noted location-sensing devices to location coordinates in a 3-dimensional frame of reference 66 defined by the field generating coils 28 (FIG. 1). The processor 22 is linked to a graphics processor 39. The graphics processor 39 is a parallel processing unit that usually has approximately 2,000 processors. Functions of the graphics processor 39 are described below.

Voxel Representation of Data Samples

The procedures described below involve three different stages:
1. Preparing the grid of voxels from a spatial model.
2. Laplacian interpolation on the grid of voxels.
3. Rendering the result, typically in pseudocolors.

Three different and unrelated interpolations are involved in the procedures. They are referred to herein for convenience as interpolation types 1-3:

Interpolation Type 1: interpolation of attributes of triangle vertices

Interpolation Type 2—Laplacian interpolation on voxel attribute assignments.

Interpolation Type 3—trilinear interpolation used in image rendering

Figure 3:
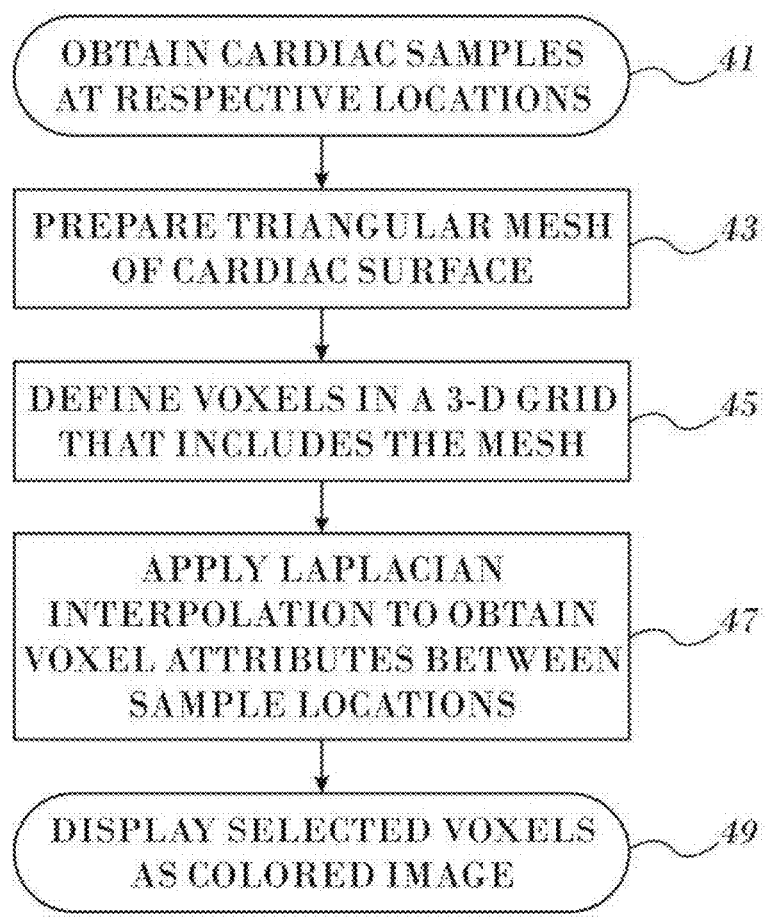
FIG. 3 is a flow chart of a method for preparing a map of a heart in accordance with an embodiment of the invention.

Reference is now made to FIG. 3, which is a high level flow chart of a method for preparing a map of a heart in accordance with an embodiment of the invention. In this and the other flow charts herein, the process steps are shown in a particular linear sequence for clarity of presentation. However, it will be evident that many of them can be performed in parallel, asynchronously, or in different orders. Those skilled in the art will also appreciate that a process could alternatively be represented as a number of interrelated states or events, e.g., in a state diagram. Moreover, not all illustrated process steps may be required to implement the method.

At initial step 41 a catheter is conventionally inserted into the heart and samples of electrophysiologic attributes, e.g., electrical annotations, are obtained at respective locations. The 3-dimensional coordinates of the locations can be identified using the tracking module 37 (FIG. 2).

Next, at step 43 a triangular mesh of the surface that models at least a portion of the heart is prepared from the locations obtained in initial step 41.

Next, at step 45 voxels are defined in a volume enclosing the mesh to create a 3-dimensional grid. The graphics processor 39 performs this operation in near real-time. The size of the grid is application-dependent. For example the grid size may be 128×128×128, 256×256×256, 512×512×512, etc. In any case there is a finite number of unknown points.

A discussion of the process of converting a triangular mesh to voxels will facilitate understanding of the principles of the invention. Most graphics processing units are optimized to render triangles to the screen. Indeed, even text in some cases is first converted to triangles. For example a quadrilateral can be constructed of two triangles.

Each triangle comprises three vertices, each having a collection of attributes: Its position in space (x, y, z) is an essential attribute. Additional optional attributes may include qualities such as brightness, color, etc. It is important, however, that all vertices have the same attributes, although the values of these attributes generally vary. Attributes of the vertices in current applications are derived from data obtained from intracardiac electrodes, e.g., local activation times, velocity vectors, voltages.

Connecting the three vertices by lines forms an empty triangle, which is filled by algorithms executed by the graphics processing unit.

On the screen the triangle (including its boundaries) is formed of pixels. The attributes of these pixels are derived from the vertices by interpolating the attributes of the vertices according to the respective distances between the pixels and the vertices (Interpolation Type 1). This interpolation is normally performed by the hardware of the graphics processing unit, and must not be confused with the Laplacian interpolation (Interpolation Type 2) described elsewhere in this disclosure.

In step 45 the above details are exploited by using the position of each vertex in a local coordinate system, normally based on the geometric center of the mesh, to the graphics processing unit as one of its attributes. Each pixel in the screen is assigned a position by Interpolation Type 1, This value determines if the pixel is encompassed in a voxel. The voxels that are identified are then saved as a 3-dimensional image, i.e., a 3-dimensional grid, each voxel having application-specific attributes as noted above.

Then, attributes of a set of the voxels are assigned by associating the data from sampled locations in the heart with corresponding voxels in the grid, marking the voxels containing the data as "known voxels". Voxels lacking data values are referred to as "unknown voxels".

Then, at step 47 Laplacian interpolation (Interpolation type 2) is performed to assign the attributes of unknown voxels in the grid based on the attributes of the known voxels. For purposes of rendering, each vertex of the mesh is now found in one of the voxels. Details of algorithms for performing step 47 are given below. At this point, it is important to note that the inputs for the algorithms are the unknown voxels and the known voxels. The latter correspond the sampled locations in the first iteration. The outputs of the algorithm now each have an interpolated attribute value, and are added to the set of known voxels. In other words at the beginning of the algorithm relatively few voxels have known attribute values. Upon completion of the algorithm each originally unknown voxel has interpolated attribute values. However, at this stage, the voxels have not been "colored" for display.

Next, at final step 49 voxels including the surface of the mesh (referred to as "bounding voxels"), are converted to a 3-dimensional image for display. For each pixel a trilinear interpolation (Interpolation Type 3) is performed against the 8 voxels adjoining the voxel that contains that pixel. The conversion involves a transformation from a local coordinate system to a coordinate system of the system 10. Trilinear interpolation (Interpolation Type 3) is conventional and is described, for example in the document Trilinear Interpolation, published on the Internet by Wikipedia, which is herein incorporated by reference.

Conventional rendering is a standard technique. As noted above, each pixel of a triangle has an interpolated value (interpolation type 1) derived from the 3 vertices of its containing triangle. Each pixel as assigned a color based on its interpolated value. Assuming the interpolated value is normalized to a value between 0-1 the colors may be assigned as follows: 0=Red; 1=Purple with intermediate values being assigned in ascending order to yellow, green, cyan and blue. For example, an interpolated value of 0.1 would be displayed as a color between red and yellow.

It will be recalled that each voxel has been assigned attribute values by Laplacian interpolation. The values can be associated with colors as described above. However, when rendering voxels, it is not sufficient to merely render the voxel value, as this would result in a grainy distribution of colors, and an unpleasing image. Instead the trilinear interpolation (Interpolation type 3) described above is carried out by the hardware in the graphics processing unit.

Figure 4:
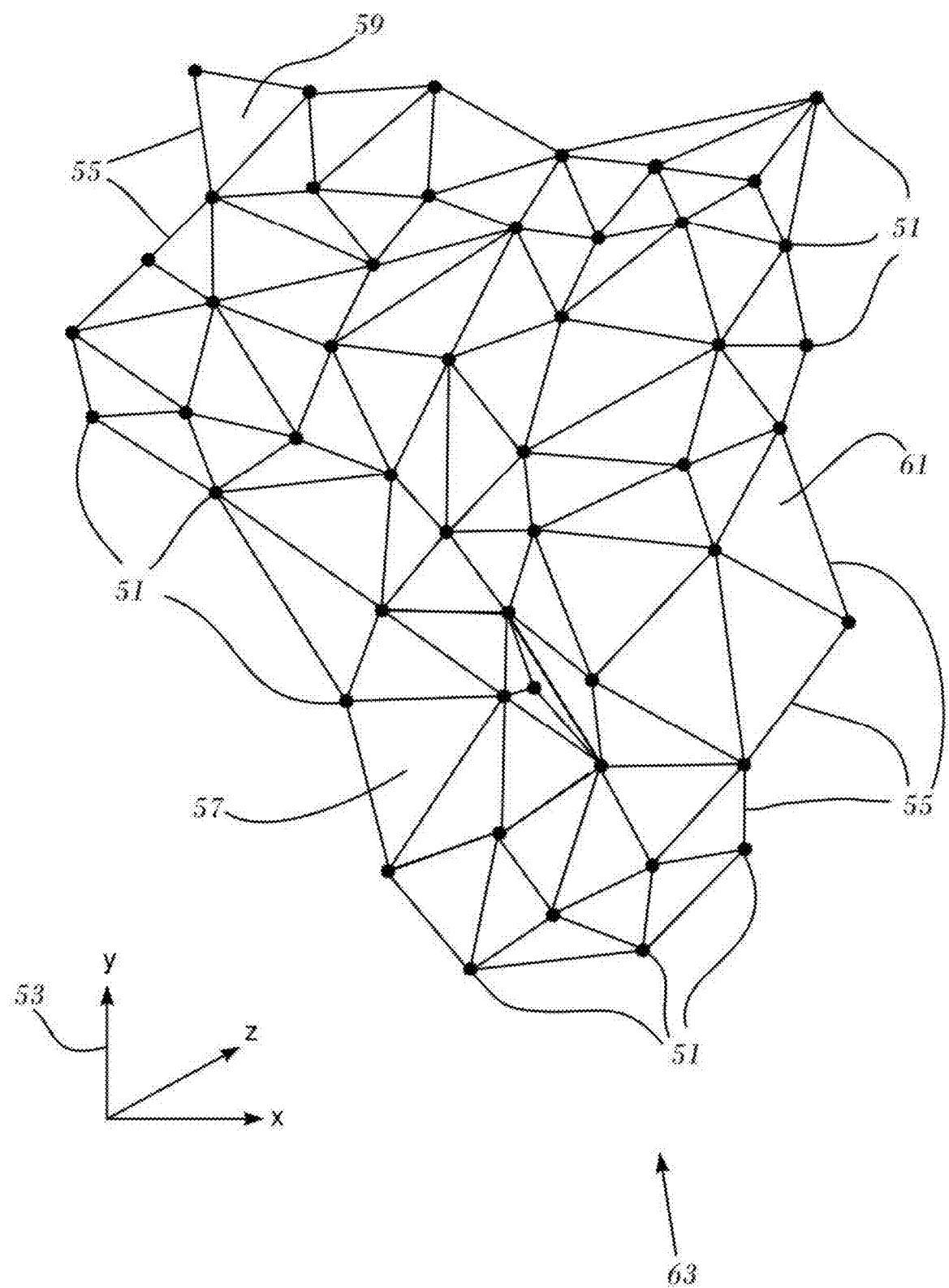
FIG. 4 is a schematic illustration of a mesh in accordance with an embodiment of the invention.

Reference is now made to FIG. 4, which is a schematic illustration of points 51 of a mesh in accordance with an embodiment of the invention. Points are registered by electrodes 33 (FIG. 1), when in contact with the endocardial surface of the heart 12. Typically during the mapping referred to above, processor 22 initially stores 3-dimensional coordinates of points 51 as measured in a 3-dimensional frame of reference 53 defined by the field generating coils 28. The processor 22 then connects 3-dimensional coordinates of points 51, herein also termed 3-dimensional vertices, by line segments 55 to produce a set of connected 3-dimensional triangles, e.g., triangles 57, 59, 61. The procedures described in commonly assigned U.S. Patent Application Publication No. 2015/0164356, entitled Dynamic Feature Rich Anatomical Reconstruction from a Point Cloud, which is herein incorporated by reference, may be used to produce the mesh 63. Other suitable algorithms include the ball-pivoting algorithm to produce the mesh 63. Typically, if the ball-pivoting algorithm is used, a size of the ball is set to correspond to the size of the voxels referred to below. Alternatively, the mesh may be generated as a Delaunay triangulation. Elements of the mesh each have 3-dimensional coordinates.

In one application the triangular mesh 63 models the endocardial surface. As noted above in final step 49 (FIG. 3), the processor 22 (FIG. 3) uses the graphics processor 39 to render the mesh 63 into an image for display on the monitor 29 (FIG. 1).

Figure 5:
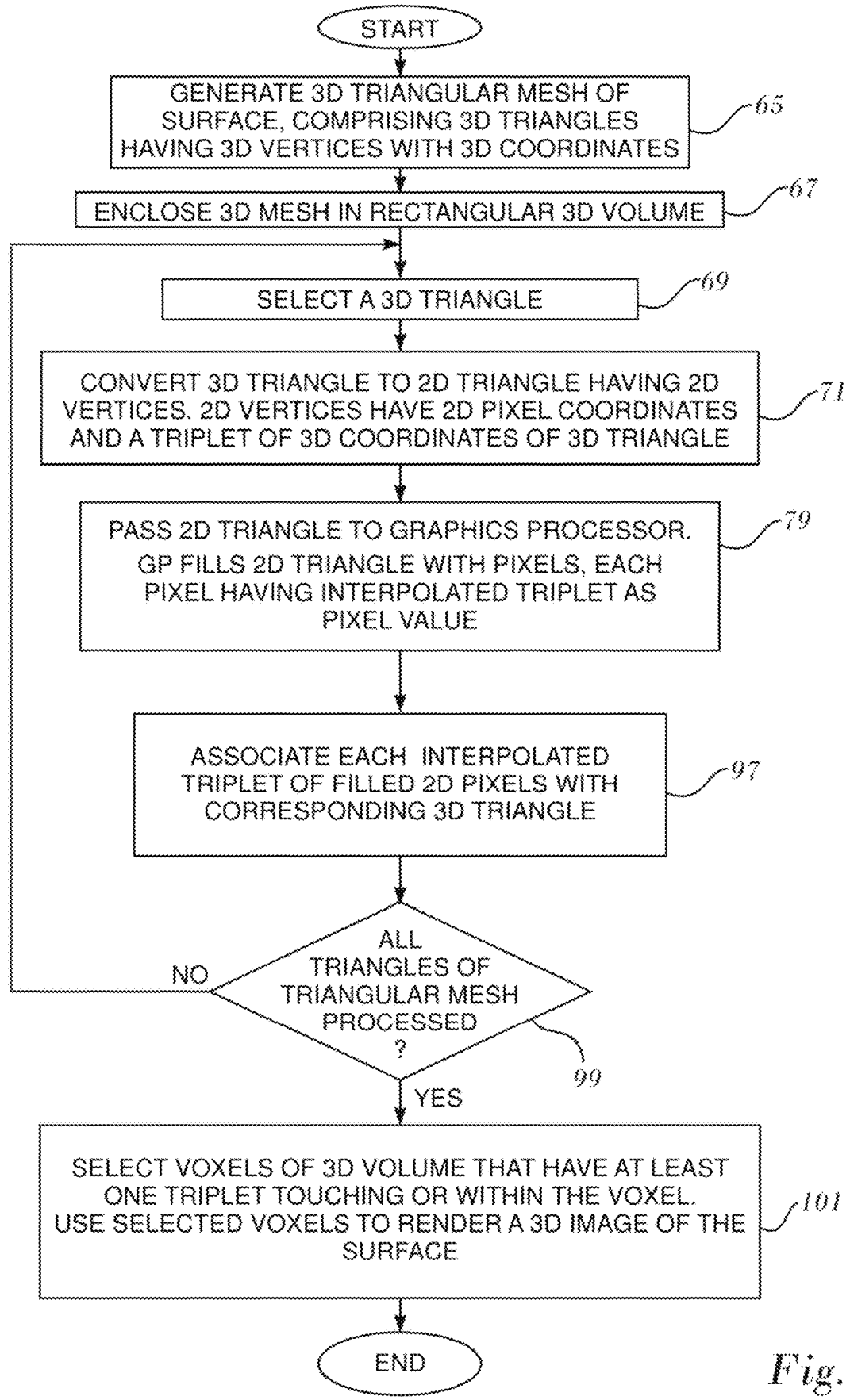
FIG. 5 is a detailed flow chart of a method for preparing a map of a heart in accordance with an embodiment of the invention.

Reference is now made FIG. 4 and to FIG. 5. FIG. 5 is a detailed flow chart of a method for preparing a map of a heart in accordance with an embodiment of the invention. In an initial step 65, the processing unit generates a 3-dimensional triangular mesh, herein assumed to comprise mesh 63. The generation of mesh 63 comprises determining 3-dimensional coordinates, as ordered triplets, of 3-dimensional points 51 of the mesh 63, then determining equations of line segments 55 connecting the points 51 to form 3-dimensional triangles 57, 59, 61, in frame of reference 53.

In an enclosure step 67, the 3-dimensional mesh 63 is enclosed in a 3-dimensional volume composed of voxels. Typically, although not necessarily, edges of the enclosing volume are selected to be parallel to the xyz axes of frame of reference 53. The number and size of the voxels may be user-selected. The voxels are typically cubic and are typically equal in size. Typical 3-dimensional volumes may comprise 128×128×128 or 512×512×512 voxels, but embodiments of the present invention are not limited to these specific values, and other convenient voxel configurations for the 3-dimensional volume may be selected.

Figure 6:
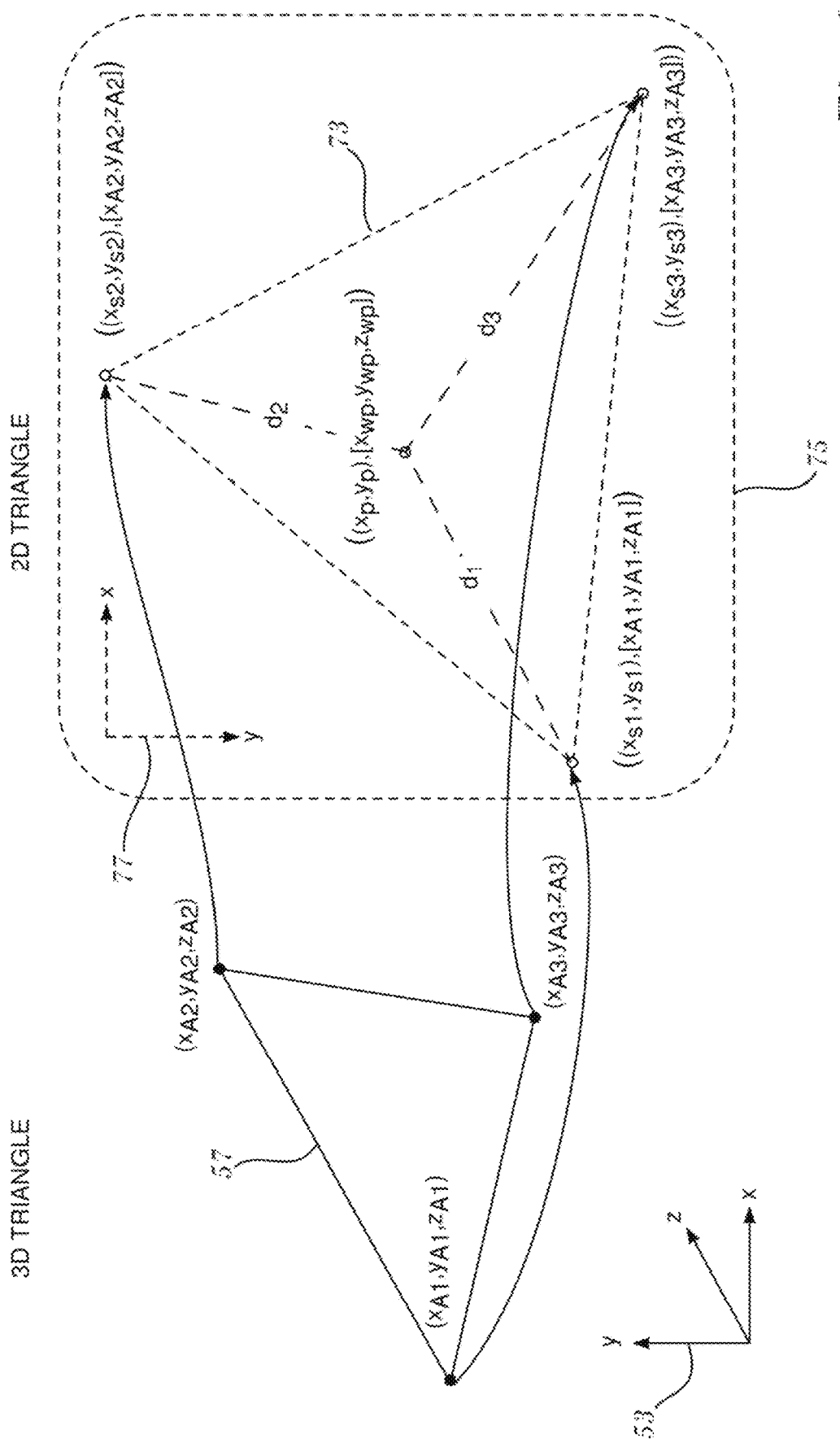
FIG. 6 is a diagram illustrating a transformation of a triangle in 3-dimensional space to a triangle in 2-dimensional space.

In a triangle selection step 69 152, the processor 22 selects a 3-dimensional triangle, herein assumed to be triangle 57, and registers the 3-dimensional coordinates of the vertices of the triangle, assumed to be triplets (xA1, yA1, zA1), (xA2, yA2, zA2), (xA3, yA3, zA3) in FIG. 6.

In a conversion step 71, in preparation for inputting data to graphics processor 39, the selected 3-dimensional triangle is converted to a 2-dimensional triangle. Each of the 3-dimensional coordinates of the 3-dimensional vertices of the selected triangle is placed in a one-one correspondence with respective 2-dimensional coordinates of 2-dimensional vertices. Each of the 2-dimensional vertices has 2-dimensional pixel coordinates and a triplet of pixel attributes of the corresponding 3-dimensional vertex.

FIG. 6 and Table 1 below illustrate the correspondence formed in step 71.

TABLE 1

| 3-dimensional Triangle<br>3-dimensional Vertices | 2-dimensional Triangle<br>2-dimensional Vertices and Pixel Triplet |
| --- | --- |
| $(x_{A1}, y_{A1}, z_{A1})$ | $((x_{s1}, y_{s1}), [x_{A1}, y_{A1}, z_{A1}])$ |
| $(x_{A2}, y_{A2}, z_{A2})$ | $((x_{s2}, y_{s2}), [x_{A2}, y_{A2}, z_{A2}])$ |
| $(x_{A3}, y_{A3}, z_{A3})$ | $((x_{s3}, y_{s3}), [x_{A3}, y_{A3}, z_{A3}])$ |

FIG. 6 illustrates 3-dimensional triangle 57, with its three 3-dimensional vertices, drawn in frame of reference 53. A 2-dimensional triangle 73, corresponding to 3-dimensional triangle 57, has been drawn on a 2-dimensional screen 75, which has a 2-dimensional frame of reference 77. Triangle 73, screen 75, and frame of reference 77 have been drawn in broken lines to indicate that the correspondence generated in step 71 does not involve any actual placement of points on a screen, and that screen 75 is a virtual screen. Thus, 2-dimensional triangle 73 is drawn in broken lines since there is no actual triangle 73.

As is described further below, step 71 is repeated for different 3-dimensional triangles selected in step 69. However, while the 3-dimensional triangles may be different, the 2-dimensional triangle into which they are converted may be the same, so that in this case there is one common 2-dimensional triangle for all the 3-dimensional triangles. In some embodiments the 2-dimensional vertices of the common 2-dimensional triangle are selected so that the 2-dimensional triangle fills screen 75. In this case, and assuming that screen 75 in frame of reference 53 has corners (1,1), (1,−1), (−1,−1), and (−1,1) Table 2 applies for the correspondence.

TABLE 2

| 3-dimensional Triangle<br>3-dimensional Vertices | 2-dimensional Triangle<br>2-dimensional Vertices and Pixel Triplet |
| --- | --- |
| $(x_{A1}, y_{A1}, z_{A1})$ | $((0.0, 1.0), [x_{A1}, y_{A1}, z_{A1}])$ |
| $(x_{A2}, y_{A2}, z_{A2})$ | $((-1.0, -1.0), [x_{A2}, y_{A2}, z_{A2}])$ |
| $(x_{A3}, y_{A3}, z_{A3})$ | $((1.0, -1.0), [x_{A3}, y_{A3}, z_{A3}])$ |

In a GP input and filling step 79 the processor 22 passes the 2-dimensional vertices and associated pixel triplets of the 2-dimensional triangle to the graphics processor 39. The graphics processor 39 is configured, on receipt of the three 2-dimensional vertices, to fill triangle 73 with 2-dimensional pixels, each 2-dimensional pixel having respective 2-dimensional screen coordinates $(x_p, y_p)$, p=1, 2, 3, . . . .

In addition, the graphics processor 39 is configured to treat the attributes of each pixel triplet associated with the 2-dimensional vertices as interpolatable values. Laplacian interpolation is applied to each element of the triplets.

An expression for $[x_{wp}, y_{wp}, z_{wp}]$ is given by Equation 1:

$$[x_{wp}, y_{wp}, z_{wp}] \equiv [w_1 x_{A1} + w_2 x_{A2} + w_3 x_{A3}, \qquad \text{Eq. (1)}$$
$$w_1 y_{A1} + w_2 y_{A2} + w_3 y_{A3}, w_1 z_{A1} + w_2 z_{A2} + w_3 z_{A3}]$$

where $w_1$, $w_2$, $w_3$ are normalized weighting factors that are inversely proportional to distances $d_1$, $d_2$, $d_3$ from 2-dimensional pixel $(x_p, y_p)$ to 2-dimensional vertices $(x_{s1}, y_{s1})$, $(x_{s2}, Y_{s2})$, $(x_{s3}, Y_{s3})$.

For example, if $d_1=d_2=d_3$, then $w_1=w_2=w_3=\frac{1}{3}$. As a second example, if $d_1=d_2=2$-dimensional$_3$, then $w_1=w_2=\frac{1}{4}$ and $w_3=\frac{1}{2}$.

In step 79 the processing unit determines the values of a respective triplet $[x_{wp}, y_{wp}, z_{wp}]$, according to Equation 1, for each of the 2-dimensional pixels $(x_p, y_p)$ that fill 2-dimensional triangle 73.

In an association step 97, the values of each triplet $[x_{wp}, y_{wp}, z_{wp}]$, of the filled pixels in step 79, are associated with triangle 57, forming a set $\{S\}$ of triplets for the triangle, and the processing graphics processing unit stores the set of triplets. It will be apparent from equation (1) that each triplet of set $\{S\}$ is equivalent to a 3-dimensional point within triangle 57.

In a decision step 99, the processor 22 checks if a set of triplets, i.e., a set of 3-dimensional points within a given 3-dimensional triangle, has been stored for all 3-dimensional triangles in mesh 63. If a 3-dimensional triangle exists without such a set, then the flowchart returns to step 69. If respective sets of 3-dimensional points have been stored for all triangles in mesh 63, then the flowchart continues to a voxelization step 101.

In voxelization step 101 for each voxel of the 3-dimensional volume formed in enclosure step 67 processor 22 checks if at least one of the triplets stored in step 97 is contained in, or touches, the voxel. Such a voxel is "marked," or selected as a bounding voxel, as being assumed to be a voxel comprised in surface 15 (FIG. 1). All other voxels in the 3-dimensional volume, i.e., those not enclosing or touching a triplet stored in step 97, are assumed to be not comprised in surface 15.

Processor 22 uses the voxel coordinates of the selected voxels to render the surface 15 on monitor 29 (FIG. 1).

Laplacian Interpolation

The Laplacian operator $\nabla^2$ is a differential operator given by the divergence of the gradient of a function on Euclidean space If $f$ is a twice-differentiable function, then the Laplacian of $f$ is the sum of all the unmixed second partial derivatives in the Cartesian coordinates $x_i$ $$\Delta f = \nabla^2 f = \nabla \cdot \nabla f$$
$$\nabla = \left(\frac{\partial}{\partial x_1}, \dots, \frac{\partial}{\partial x_n}\right).$$

Equivalently, the Laplacian of is the sum of all the unmixed second partial derivatives in Cartesian coordinates $x_i$ $$\Delta f = \sum_{i=1}^{n} \frac{\partial^2 f}{\partial x_i^2}$$

As explained in the document *Computational Statistics with Application to Bioinformatics*, William H. Press, The University of Texas at Austin, CS 395T, Spring 2010, which is herein incorporated by reference, Laplacian interpolation has the desirable property of maximizing smoothness. If y satisfies $\nabla^2 y=0$ in any number of dimensions, then for any sphere not intersecting a boundary condition, $$\frac{1}{\text{area}} \int_{\text{surface } \omega} y \, d\omega = y(\text{center})$$

Laplacian interpolation involves setting $y(x_i)=y_i$ at every known point and to solve $\nabla^2 y=0$ at every unknown point.

Computation Algorithm

The algorithm, adapted to voxel interpolation, is divided into 2 parts:

Mark known data.

Iterate over all voxel data until a condition is reached.

The first part involves simply marking all unknown data locations as empty and the voxel with its value, e.g., intensity, LAT, voltage.

The second part has two major sections. (1) computing an average function to approximately satisfy the Laplace equation and (2) iterating the computation over all data. Pseudocode is given in Listing 1.

Listing 1

```
Mark all voxels empty
Fill known voxels with their sampled data values (intensity, LAT etc...)
Iterate Until no voxel is changed
    //Repeat over all voxels
    For each voxel do:
        Calculate average of the neighboring voxels using the average
        function
        If the voxel is empty
            Fill with average value.
        Else
            Compare the averaged value (A) with the current voxel value
            (V_i)
            If they are same (within a threshold limit)
                do nothing
            Else.
```

Add the difference (D=A−Vi) to the currentvoxel value mark this voxel as changed. The new value is:

$$V_{i+1} = V_i + D.$$

If no voxel is changed in the current iteration then end.

Average Function

The average function used in a current embodiment is calculated as shown in Listing 2.

Listing 2

Sum all values from non-empty neighbors.
If there are no non-empty neighbors
    do nothing
Else
    Divide the sum by the number of non-empty neighbors For purposes of Listing 2, a neighbor of a given voxel is an adjoining, i.e., a facing voxel. In a grid fully populated by non-empty voxels, the sum is taken from the six voxels that directly face the given voxel, i.e., left, right, top, bottom, front and rear voxels. A diagonally located voxel is not a neighbor. The terms "left, right, top, bottom, front and rear" are used arbitrarily herein to distinguish the locations of voxels with respect to other voxels, These terms have no physical meanings with respect to the actual configuration of the grid.

In one variant of the algorithm of Listing 2, a weight is applied to the values, the weight being inversely proportional to a distance between a given 2-dimensional vertex and the neighboring voxel.

Alternate Embodiment

In this embodiment a 3-dimensional model of a surface, such as the heart, is constructed of voxels and does not necessarily require processing of a triangular mesh of pixels. The voxel model may be prepared by any modeling technique.

When the heart is catheterized, readings of electrophysiologic attributes are obtained at known locations, for example, using the above-described location sensing capabilities of the CARTO system.

The known locations are projected or associated directly with voxels of the model, and become references for any of the iterative Laplacian interpolation algorithms described above to determine the attributes of the other voxels in the grid. Laplacian interpolation (interpolation type 2) between neighbors, and the average function described above may be used to determine the attributes of the other voxels. For computational efficiency only those voxels that touch or contain a surface of the 3-dimensional model are selected for interpolation.

Figure 8:
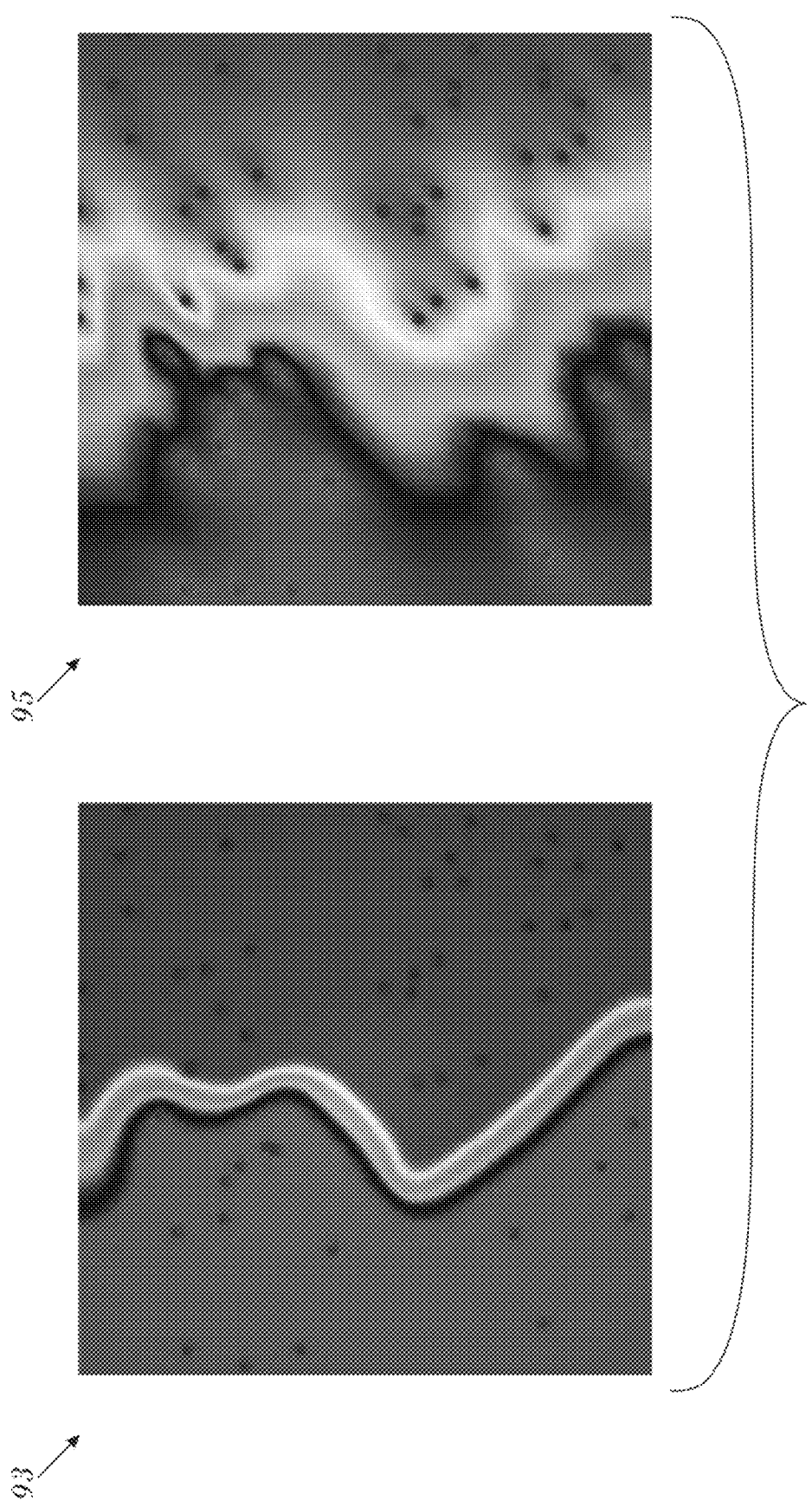
FIG. 8 is a composite of two maps prepared conventionally and in accordance with an embodiment of the invention.

The typical progress of the algorithm is illustrated in the example of FIG. 8.

Example 1

Figure 7:
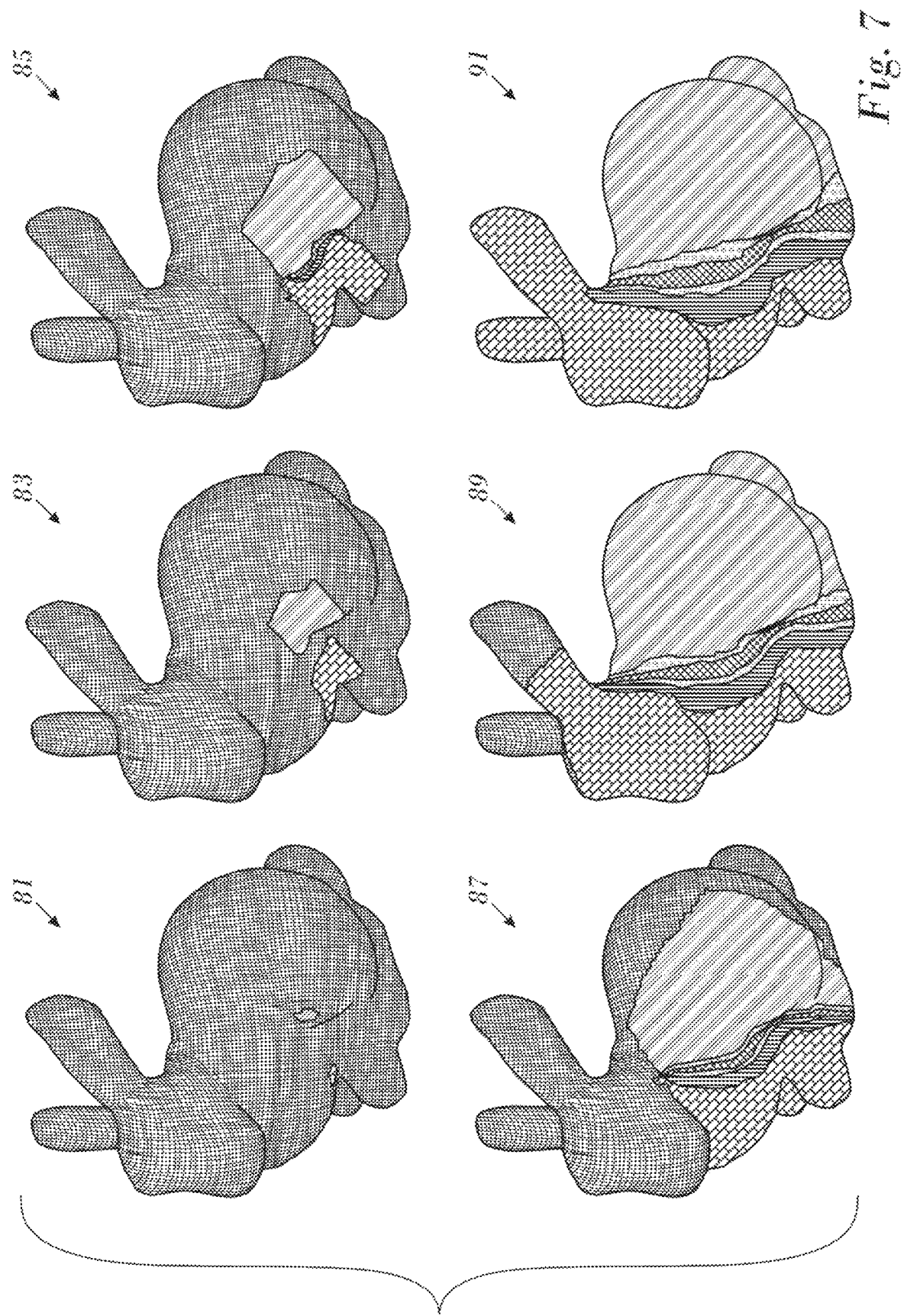
FIG. 7 is a series of images illustrating an application Laplacian interpolation to an exemplary 3-dimensional surface, in accordance with an embodiment of the invention.

Reference is now made to FIG. 7, which is a series of images illustrating an application of the above-described iterative computation algorithm for Laplacian interpolation to an exemplary 3-dimensional surface, in accordance with an embodiment of the invention. Images 81, 83, 85, 87, 89, 91 represent the progress of the algorithm at iteration 5, 15, 25, 50, 200 and 1675, respectively.

Example 2

Reference is now made to FIG. 8, which is illustrates portions of two cardiac maps in accordance with an embodiment of the invention. Both map 93 and map 95 correspond to electrical data, equivalent to that which can be obtained during a cardiac catheterization. Spatial variations in the function being mapped are typically represented by pseudo-colors. Map 93 was generated using the algorithm described above. Map 95 was prepared using the commercially available procedures of the CARTO 3 system. It is evident that the discretized zones are more sharply defined on map 93 than on map 95.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

What is claimed is:

1. A method for 3-dimensional rendering, comprising:
receiving a group of 3-dimensional triangles defining a triangular mesh of a 3-dimensional surface, each 3-dimensional triangle in the group having three 3-dimensional vertices with respective 3-dimensional coordinates;
transforming each 3-dimensional triangle into a corresponding 2-dimensional triangle having three 2-dimensional vertices corresponding respectively to the 3-dimensional vertices, each 2-dimensional vertex having respective 2-dimensional pixel coordinates and a triplet of pixel attributes corresponding to the 3-dimensional coordinates of a corresponding 3-dimensional vertex;
passing each 2-dimensional triangle to a graphics processor, which treats the triplet of pixel attributes of each 2-dimensional vertex as interpolatable values;
in the graphics processor, computing respective triplets of interpolated pixel attributes for pixels within each 2-dimensional triangle; and
converting the interpolated pixel attributes computed by the graphics processor into voxels;
iteratively assigning attribute values to a portion of the voxels to establish a set of known voxels;
iteratively performing Laplacian interpolation between the known voxels and other voxels to assign interpolated attribute values to the other voxels; and
rendering a 3-dimensional image of the voxels.

2. The method according to claim 1, wherein the voxels are bounded by bounding voxels and are rendered as plurality of screen pixels, further comprising assigning colors according to the attribute values and the interpolated attribute value of the voxels, wherein rendering comprises performing trilinear interpolation for each screen pixel with corresponding screen pixels in the bounding voxels.

3. The method according to claim 1, further comprising applying an average function to a plurality of Laplacian interpolations with different known voxels.

4. The method according to claim 1, wherein converting the interpolated pixel attributes comprises computing for each 3-dimensional triangle an average value of the triplets of interpolated pixel attributes of respective transformed 2-dimensional triangles thereof.

5. The method according to claim 1, further comprising, after passing a given 2-dimensional triangle to the graphics processor, filling the given 2-dimensional triangle with the pixels within the given 2-dimensional triangle.

6. The method according to claim 1, wherein the interpolated pixel attributes comprise a weighted interpolation of the triplet of pixel attributes of each of the 2-dimensional vertices.

7. The method according to claim 6, wherein the weighted interpolation comprises applying a weight to the triplet of pixel attributes of a given 2-dimensional vertex that is inversely proportional to a distance of a given pixel to the given 2-dimensional vertex.

8. The method according to claim 1, wherein converting the interpolated pixel attributes into voxel coordinates comprises enclosing the triangular mesh in a rectangular parallelepiped of voxels, and selecting ones of the voxels containing or touching the interpolated pixel attributes as voxels of the surface.

* * * * *